United States Patent [19]

Weber

[11] 4,322,827
[45] Mar. 30, 1982

[54] RANGE EXPANDER FOR SONAR SYSTEM
[75] Inventor: Ronald G. Weber, Tulsa, Okla.
[73] Assignee: Lowrance Electronics, Inc., Tulsa, Okla.
[21] Appl. No.: 189,047
[22] Filed: Sep. 22, 1980
[51] Int. Cl.³ .............................................. G01S 15/08
[52] U.S. Cl. ..................................... 367/99; 367/109; 367/115; 343/5 DP; 365/233
[58] Field of Search .............. 365/221, 233, 239, 240; 340/731, 801; 369/59; 367/11, 87, 107, 109, 115; 343/5 SC, 5 DP

[56] References Cited
U.S. PATENT DOCUMENTS 3,790,925 2/1974 Ahrens ........................ 343/5 DP X
3,962,689 6/1976 Brunson ............................. 365/233
4,017,853 4/1977 Brandao et al. ................. 343/5 DP Primary Examiner—Richard A. Farley
Attorney, Agent, or Firm—Head & Johnson

[57] ABSTRACT

An electronic range expander, such as for use on a sonar system, which has a rotating disc lamp or a rectilinear pen record, of the travel time, expressed as a certain distance from the transducer to an object and back again. The received signal is sampled periodically, and these samples are stored in a random access memory, in addresses which are determined by binary numbers successively outputted from a binary counter, which is stepped in accordance with a clock signal. As the binary number representing an address in the memory is incremented, the sampled value of received signal is stored in the corresponding address. The command to write in the memory is repeated at a selected number of clock counts. Intermediate the commands to write into the memory, the command is given to read the signal stored in a selected address and to send it to a latch and to the output display or printer of the sonar apparatus. During the period in which the readout of data from memory takes place, a buffer in each of the leads from the counter to the memory causes the binary number from the counter to be shifted to the right one bit, and therefore the address read is ½ that of the last write address. Thus the stored values in the memory are read at ½ the rate at which they are written, which thereby causes 2/1 expansion of the time scale.

8 Claims, 6 Drawing Figures

RANGE EXPANDER FOR SONAR SYSTEM

CROSS-REFERENCE TO RELATED PATENT

This application is related to U.S. Pat. No. 3,747,053, issued to Garland R. Austin, dated July 17, 1973, entitled "Noise Rejection Circuit".

BACKGROUND OF THE INVENTION

1. Field of the Invention

This invention lies in the field of electronic time range expanders, such as might be used in connection with the display or recording of sonar signals. Still more particularly it concerns an expander in which the time rate of sequential output values of the sonar receiver are timed at one-half their normal time rate so that the time and depth scale is thereby expanded.

2. Description of the Prior Art

Most sonars which display returned echoes versus time (distance) use a motor driven mechanism to move a lamp around a disc or a stylus across electrosensitive chart paper to give the time (distance) dimension. The faster the mechanism runs, the more the scale is expanded. For instance, doubling the speed of a rotating disc from 40 revolutions per second to 80 revolutions per second will change the scale from 0-60 feet to 0-30 feet expanding (making longer) all received signals.

There is a practical limit to how fast a scan disc can be turned, or a stylus can be driven across the chart paper. As the speed increases, it becomes more susceptible to reliability and wear problems because stress increases on the mechanism. A number of means have been developed to expand the sonar information without increasing the speed of the mechanism. They all involve digitizing the detected sonar signal, storing it in a random access memory or shift register, and later sending it out serially at a slower rate. All of these ways involve a lot of circuitry and delay of the display of the sonar signal until the memory or shift register has been filled. These circuits also cannot be retrofitted into sonars not specifically designed to take them.

This invention utilizes a circuit that has fewer components, does not delay the display of the sonar signal, and is retrofitable into any sonar by simply placing it in series with the signal line to the display driver.

SUMMARY OF THE INVENTION

It is a primary object of this invention to provide a time range expander such as might be used on the indicator or recorder of a sonar system in which the time scale can be expanded by a factor of two, four, or any other multiple of two.

It is a further object of this invention to provide a simple self-contained circuit which can be inserted into an existing sonar apparatus without modification of that apparatus, to provide an expanded time scale.

These and other objects are realized and the limitations of the prior art are overcome in this invention by providing an apparatus which basically uses a concept previously only used in computer software, and now used for the first time in hardware. It is the fact that when a binary number is shifted right, all the binary bits are shifted one position in a binary number, dropping off the farthest right, or the least significant, digit, the original is divided by two. If the shift right is two positions, then the number is divided by 4, and so on, as per the example:

$$\text{Binary} \begin{Bmatrix} 1 \, 0 \, 1 \, 1 \, 0 \, 0 = 44 \\ 0 \, 1 \, 0 \, 1 \, 1 \, 0 = 22 \\ 0 \, 0 \, 1 \, 0 \, 1 \, 1 = 11 \end{Bmatrix} \text{Decimal}$$

In a flasher sonar a received sonar signal either is strong enough to light the lamp or it is not. In binary terms it is either a "1" (or high) or "0" (or low) (lamp off). If the received signal is sampled at a certain rate, a sequence of "1's" or "0's" representative of the sonar signal signal results.

The apparatus basically includes a random access memory (RAM), a binary counter, and a clock. The incoming analog signal from the sonar transducer is sampled as a function of the timing of the clock pulses. The samples are stored in addresses which are sequentially outputted from the binary counter.

While data are written into the RAM in accordance with the binary numbers outputted from the counter, they are read from addresses corresponding to the binary number displayed by the counter shifted to the right by one bit. By this means the address number is halved. Thus, on successive read commands the samples stored in a single address are read twice, before proceeding to the next higher address. Thus, while a series of data samples are being written at a selected rate, first into address 1, then 2, then 3, then 4, then 5, and so on, they are also being read out at half the frequency. Thus on readout the data stored in address 1 is read, then 1 again, then 2, then 2 again, then 3, then 3 again, and so on. So, whereas the writing has filled six addresses, the reading has only sampled three of those addresses. Therefore, in time taken to write six samples of the signal it has only displayed three samples of the signal and, therefore, the light will have to move twice as far to display a record from all of the addresses. Thus the depth scale has been expanded by a factor of two. It is possible also to shift by a factor of 4, and so on, to get further expansion of the scale.

BRIEF DESCRIPTION OF THE DRAWINGS

These and other objects and advantages of this invention and a better understanding of the principles and details of the invention will be evident from the following description taken in conjunction with the appended drawings in which.

DETAILED DESCRIPTION OF THE PREFERRED EMBODIMENTS

Figure 1:
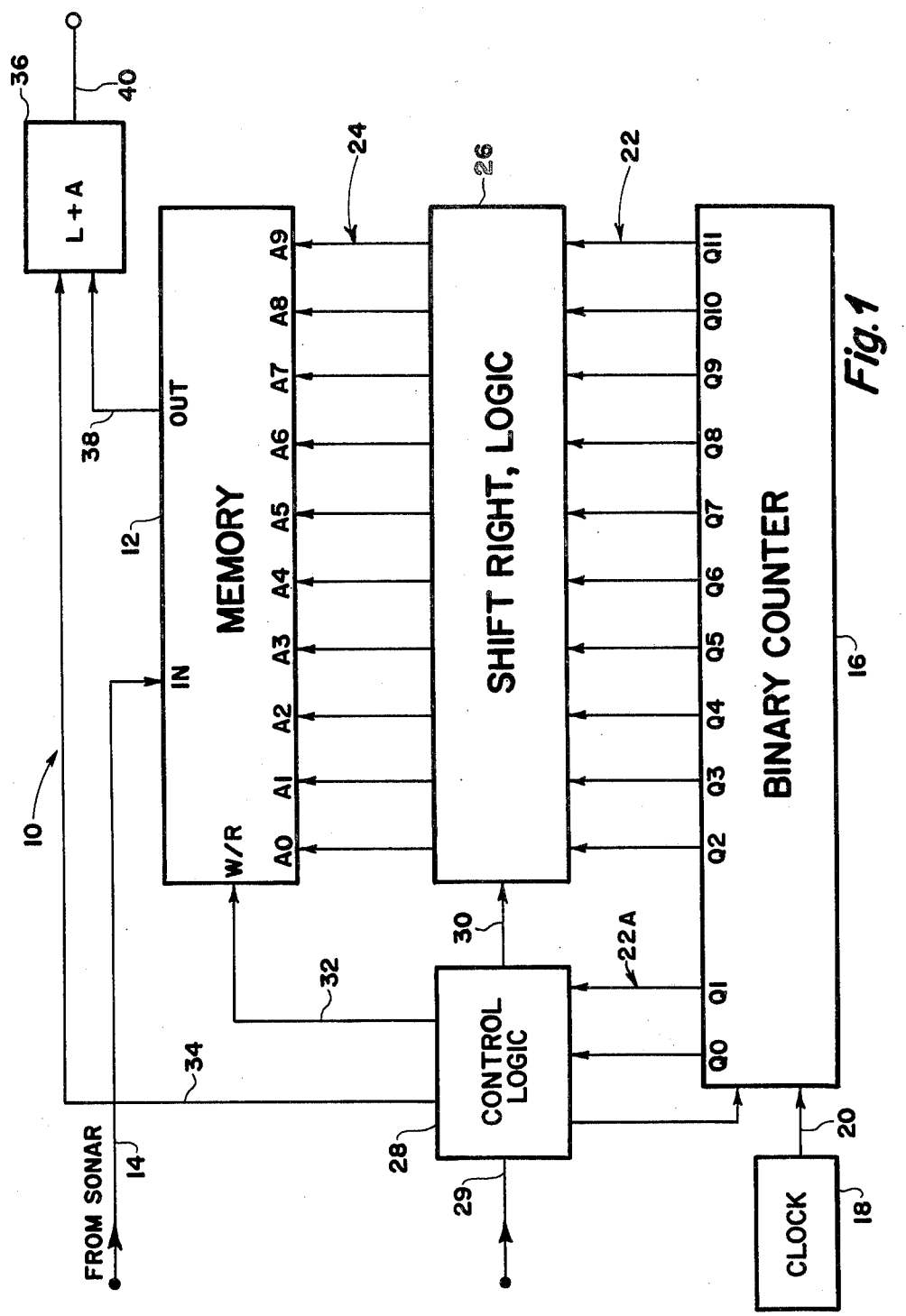
FIG. 1 represents in a schematic block diagram one embodiment of this invention.

Referring now to the drawings and in particular to FIG. 1, there is shown in schematic block diagram form, one embodiment of this apparatus, indicated generally by the numeral 10. It comprises a random access memory (RAM) 12. The signal line 14 from the sonar received (not shown) is connected to the input to the memory. A binary counter 16 is connected by lead 20 to a clock 18 of selected frequency of output pulses. On each clock pulse, the binary counter is stepped up by 1. A binary count is outputted on leads 22 representing the instantaneous count. The binary count on leads 22 represents successive numbers from 0 on up to a selected maximum N. The least significant two bits Q0 and Q1 of the outputted binary number on 22 go to control logic 28 which times the various operations of the apparatus. The other more significant bits of the counter 16 are outputted over leads 22 (from Q2, A2, ... QN), and 24 to the memory 12.

A shift right logic box 26 is inserted between the leads 22 and 24, which is activated by signals over lead 30 from the control logic 28. The output lead 38 from the memory 12 goes to a latch 36 and to an output lead 40 to operate the display or the recorder of the sonar system. The latch 36 is controlled by the control logic 28 over lead 34. The control logic also supplies signals over the lead 32 to the memory 12 enabling writing and reading alternately in terms of the clock pulses. A signal over lead 29 resets the binary counter 16, and it starts to count clock pulses. It sends Q0 and Q1 signals over 22A to time the control logic 28. Its Q2, Q3, Q4, Q5, etc. terminals connect to the shift right logic 26 and to the memory 12, to input terminals A0, A1, A2, A3, etc.

The binary number on leads 22 represents specific addresses in the memory 12 into which samples of the input signal on line 14 are written in accordance with a write instruction over lead 32 from the control logic 28. At intervening times between the write signals to the memory 12, read signals are supplied and the memory outputs a signal which has been stored in a specific address, through lead 38 to the latch/amplifier 36, to the output lead 40.

The purpose of the shift right logic 26 is to cause the addresses in the memory which are to be read, to have a different sequence than the addresses into which the samples of the input signal are to be written. While the counter is outputting binary numbers which increase by one from 0 on up to a selected number N, and samples of the sonar signal are stored in corresponding addresses starting with 0 and increasing by 1 up to N. On the read operation, the control lead 30 from the control logic 28 causes the A0 terminal of the memory to be connected to the next most significant digit terminal, as will be explained in more detail in accordance with FIG. 3.

The output of signals from the memory are read sequentially from addresses 0, 0, 1, 1, 2, 2, 3, 3, and so on, whereas the sequential address words on the write operation are 0, 1, 2, 3, 4, 5, 6, 7, 8, ... N. Thus, it takes twice as long to read out a selected number of samples than it did to write them in. In this way the same memory can be used concurrently, though alternately, to write a time advancing data stream at one rate, and to read that same data stream at a lower rate. Of course, the writing does not take place simultaneously with the reading, but the two operations are alternated between the time periods at which the address is updated by one, for the next write operation.

Figure 2:
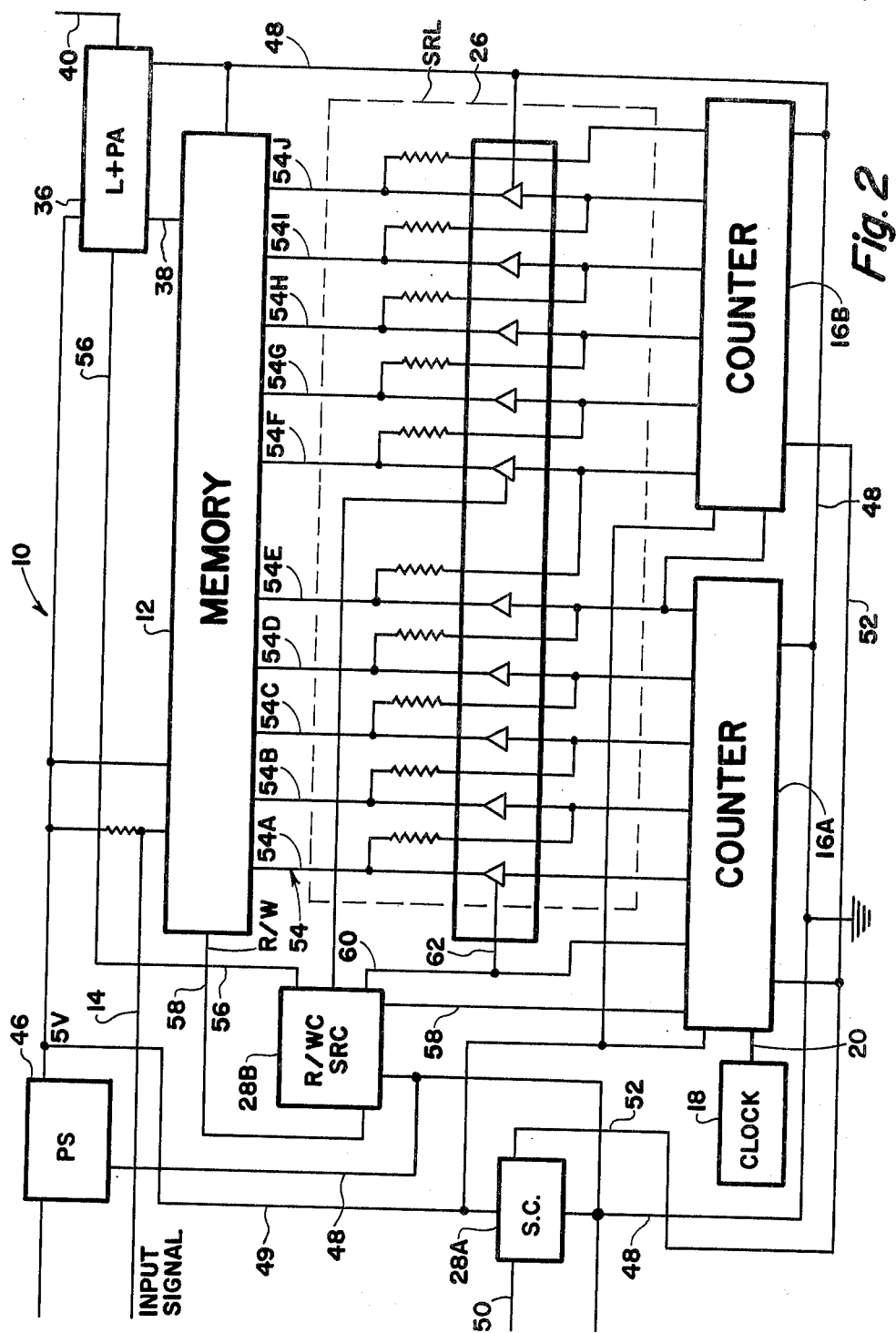
FIG. 2 represents the circuit of FIG. 1 in somewhat greater detail.

Referring now to FIG. 2 there is shown a more detailed diagram of the apparatus of this invention than was described in FIG. 1. A number of the boxes such as the clock 18, the counters 16A and 16B which are two parts of a single counter 16, the memory 12, the latch/amplifier 36, output lead 40, and input lead 14, are all the same. The shift right logic is shown in dashed box 26. The control logic 28 of FIG. 1 is broken up into two boxes 28A and 28B. The box 28A receives the signal from the transmitter, the purpose of which is to synchronise the reset of counters 16A and 16B over lead 52 each time a new signal is transmitted from the transducer. Thus each time a pulse signal is sent from the transducer, the counter starts of new cycle of counting from 0 on up to a selected number N, and correspondingly, samples of the input signal on 14 are sampled and written into the corresponding addresses in the memory 14, corresponding to the outputted binary count from the counters.

Figure 3:
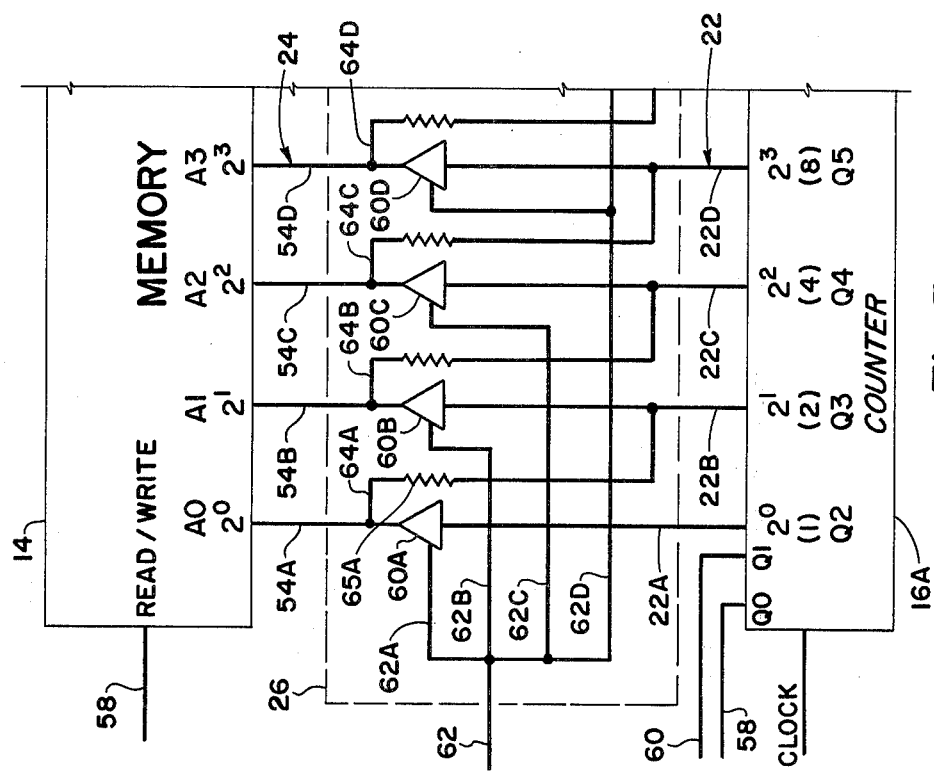
FIG. 3 represents a selected portion of the circuit of FIG. 2, describing the shift right logic.

Reference is now made to FIG. 3 for an explanation of the shift right logic box 26 shown by the dashed box in 26 in FIG. 3. The leads 54A, 54B, 54D, etc. correspond to the leads 24 of FIG. 1. The leads 22A, 22B, 22C, etc. correspond to the leads 22 of FIG. 1, the solid state buffers 60A, 60B, 60C, 60D, etc. are non-inverting 3 state buffers of the 400978 CMOS type.

The buffers 60 have control terminals which are connected to line 62 by separate lines 62A, 62B, 62C, etc. When a "0" signal (that is, a low potential) is placed on the leads 62, the buffers 60 act as a simple pass-through buffer having a low impedance. In that case the signal outputted from the counter 16A on lead 22A goes through the buffer 60A, and lead 54A, to the A0 address input of the memory. A similar signal, 0 or 1, passes through each of the buffers 60 to corresponding address terminals A0, A1, A2, etc.

When a high potential represented by a "1" signal on the lead 62, the buffers 60A, 60B, 60C, etc. become high impedance. Thus, signals on the terminals Q2, Q3, Q4, etc. of the counter do not get through to the corresponding terminals on the memory. The lead 64A that connects from 54A to 22B with a series resistor 65A of selected value (which might be 10,000 ohms., for example) which is low compared to the high impedance of the buffers (with a high signal input lead 62), makes it possible for the A0 terminal of memory to read the signal outputted by the Q3 terminal of the counter 16A.

There is a control over lead 60 (FIG. 2) which controls the read and the write times. When data are being written into memory, address A0 gets its signal from terminal Q2 of the counter. When data are being read out of memory the A0 address of the memory gets its signal from the Q3 terminal. This operation of the buffers 60 in accordance with the high or low signal (that is, 1 or 0) on the control lead 62, causes the memory to read a number of greater significance and fewer bits.

It will be clear from the above explanation that when the data are read from memory the address A0, A1, A2 are read from the next most significant bits of the count outputted by the counter. Thus the outputted signals from the memory correspond to a lower address number by a factor of 2. In effect, the address number that controlled the last write operation has been "shifted right" and what had been, for example, a four-bit number, is now a three-bit number and therefore corresponds to a number of one-half value. This corresponds in a decimal system to shifting a decimal number to the right, or shifting the decimal place to the left, and dropping the last digit on the right which results in dividing by 10. Thus the rate at which new addresses are contacted in the read operations is half of that of the write operations. Therefore, it takes twice as long to display a received signal, which means that the scale is expanded, and that is precisely the object of this invention.

Figure 4:
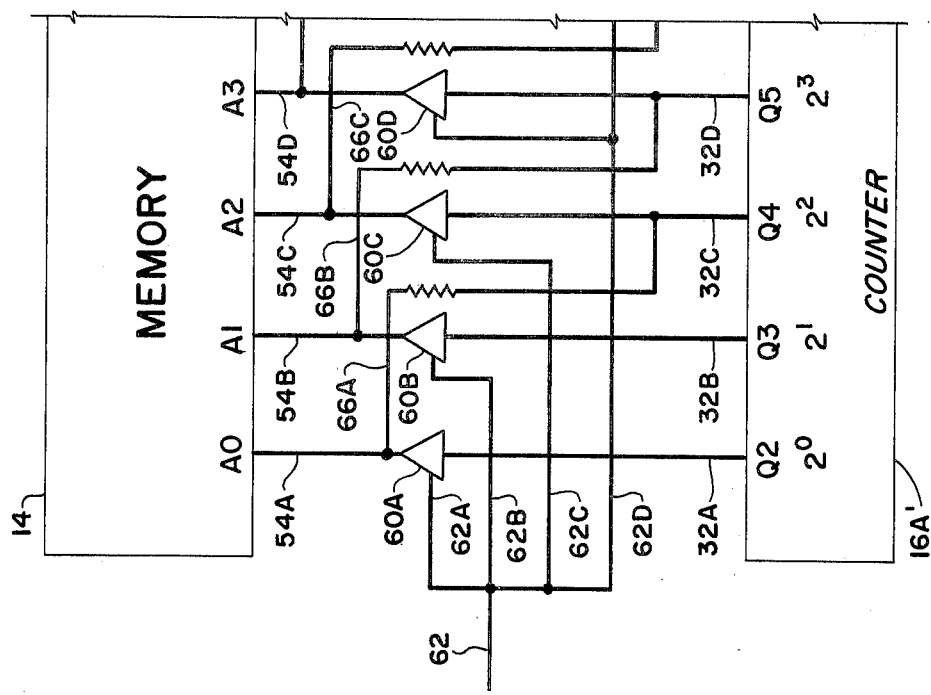
FIG. 4 represents a variation of FIG. 3 for a 4/1 expansion.

Referring momentarily to FIG. 4, there is shown a similar circuit to that of FIG. 3 except that the lines 66A, 66B, 66C, etc. connect to the second higher significance terminal. In other words, when an address A0 is indicated on the memory to be written into it, it is the Q2 value of the counter-on the other hand, when an address to be read is indicated, it is represented by the signal on the Q4 output of the counter. With these changes in wiring and the similar operation of the buffers 60A, 60B and 60C, the result is to shift to the right by two more significant bits of the binary number. In this process the decimal value of the binary number is divided by a factor of 4. This can be extended to even further expansions of the range, as desired.

Figure 5:
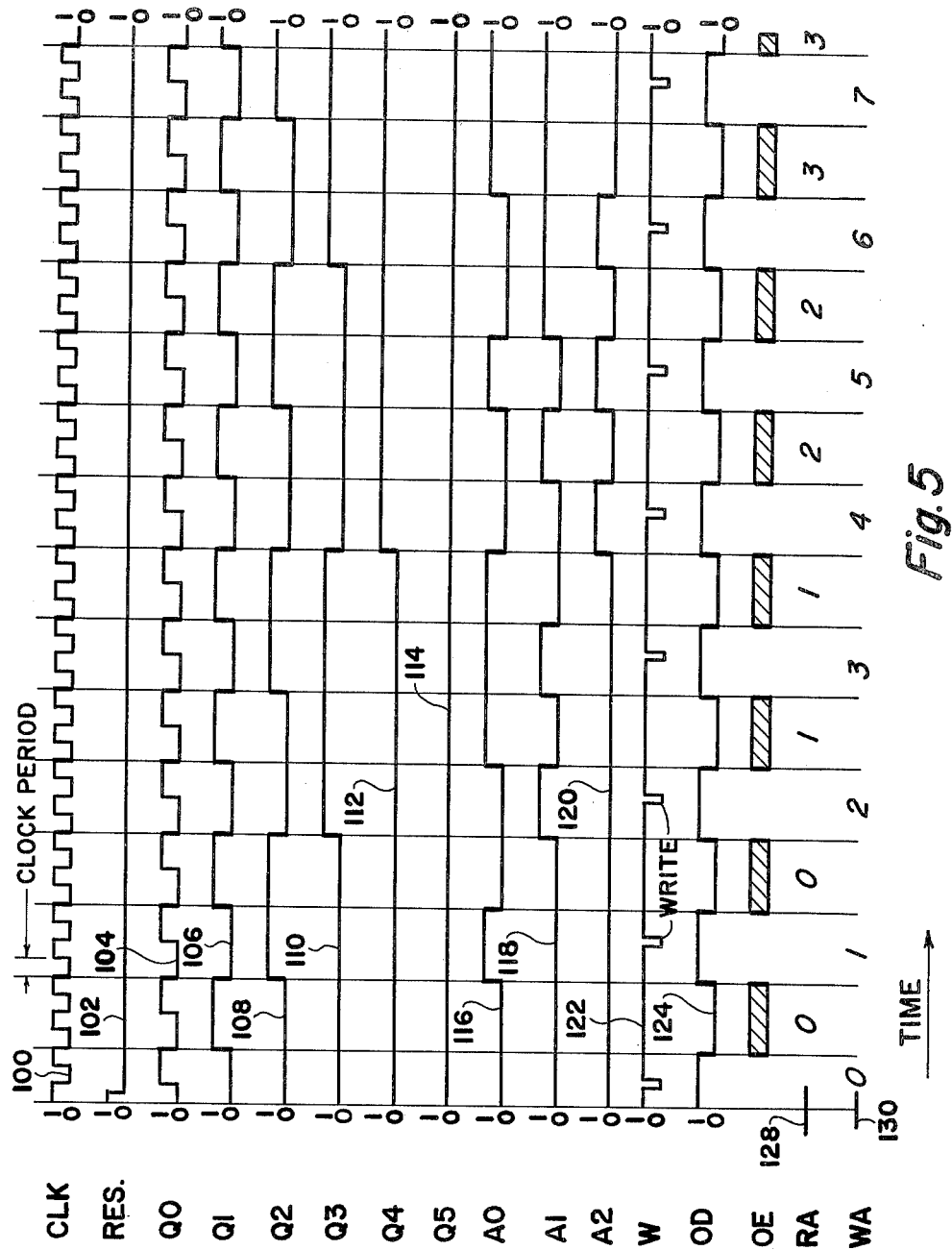
FIG. 5 illustrates the wave forms at a number of points in the circuit of FIG. 2.

Referring now to FIG. 5 there is shown a series of traces representing the wave forms of the signals at various parts of the circuit. Trace 100 represents the output of the clock 18 over lead 20. This basic clock signal controls the timing of the entire operation of the apparatus. Trace 102 represents the re-set signal that is outputted on line 52 from the transmitter, which re-sets the counter back to 0.

The output terminals Q0 and Q1 of the counter are used for timing the control circuits, and these wave forms are shown as traces 104 and 106. Trace 104 is of twice the period of the clock and trace 106 is, of course, four times the period of the clock. The next trace 108, which is the wave form of Q2, is the basic period of sampling and change of address on the memory 14. In each period of the change of address as on Q2, there are two periods of Q1, and during half of these periods Q1 is low and in the other half it is high, as will be seen from traces 122 and 124. These alternate highs and lows on trace 106 control the read/write operations of the memory and the action of the shift right logic. Going from Q2 to Q3 and Q3 to Q4 and Q4 to Q5, etc. the periods of the wave forms 108, 110, 112, 114, etc. are doubled which is the normal manner of operation of a binary counter.

The traces 116, 118, and 120 correspond to the addresses A0, A1, A2, etc. The values of A0, A1, and A2 are not identical to the values Q2, Q3, Q4, as a function of time, because at times corresponding to the half period of Q1, the terminal A0 is sequentially connected to Q2, then to Q3, and back to Q2, and so forth. Thus while Q1, Q2, and Q3 are regular wave forms the wave forms on A0, A1 and A2, etc. are modified because they successively read from one of a pair of terminals of the counter.

Trace 122 represents the write signal to the memory. The writing of data into the memory is permitted during the short time interval when the signal on the read-write lead 58 is 0. This corresponds to the 0 half period of Q1. Then during the succeeding half period of Q1 when the output is A1 (high), the read action of the memory takes place. There are successive periods equal to the period of Q0 or half periods of Q1, during which the read and write operations sequentially take place. Trace OD represents "output disabled". In other words, while the write operation is enabled, the output or read operation is disabled, and vice-versa as shown by the shaded area OE (output enabled) on trace 126. During the shaded periods, the output is read. On the two lowest traces 128 and 130 are shown what the read addresses (RA) are, and what the write addresses (WA) are.

At each write operation the corresponding addresses of the memory are connected to the appropriate direct addresses of the counter output. Thus the first write pulse shows a 0 on the Q2 trace which is the same as the A0 trace. On the next write operation the Q2 trace is high and the A0 trace is correspondingly high. On the third write operation the Q2 trace is low and the Q3 trace is high, and this is the way a normal binary counter works.

Now consider the periods represented by trace 126 when the output of the memory is enabled. The memory is read during the period in which Q1 is high. Address A0 reads what is on Q3, which is a low corresponding to a 0 on A0. On the next read operation address A0 reads Q3 which is again low and so a second reading of A0 is sent to the output. On the third read operation A0 is connected to Q3 which is high. This represents a1, and on the fourth read operation it again reads from Q3 which is still high, and this represents a1, shown on trace 128. Thus memory reads out and transmits over line 38 to the latch/ampl. 36 the stored data in sequence from addresses 0, 0, 1, 1, 2, 2, 3, 3, etc. On the write operations the addresses are advanced twice as rapidly, 0, 1, 2, 3, 4, 5, 6, 7. Thus in the time it takes to record eight samples into eight addresses, four samples in four addresses have been read out twice. This represents the expanded scale.

Figure 6:
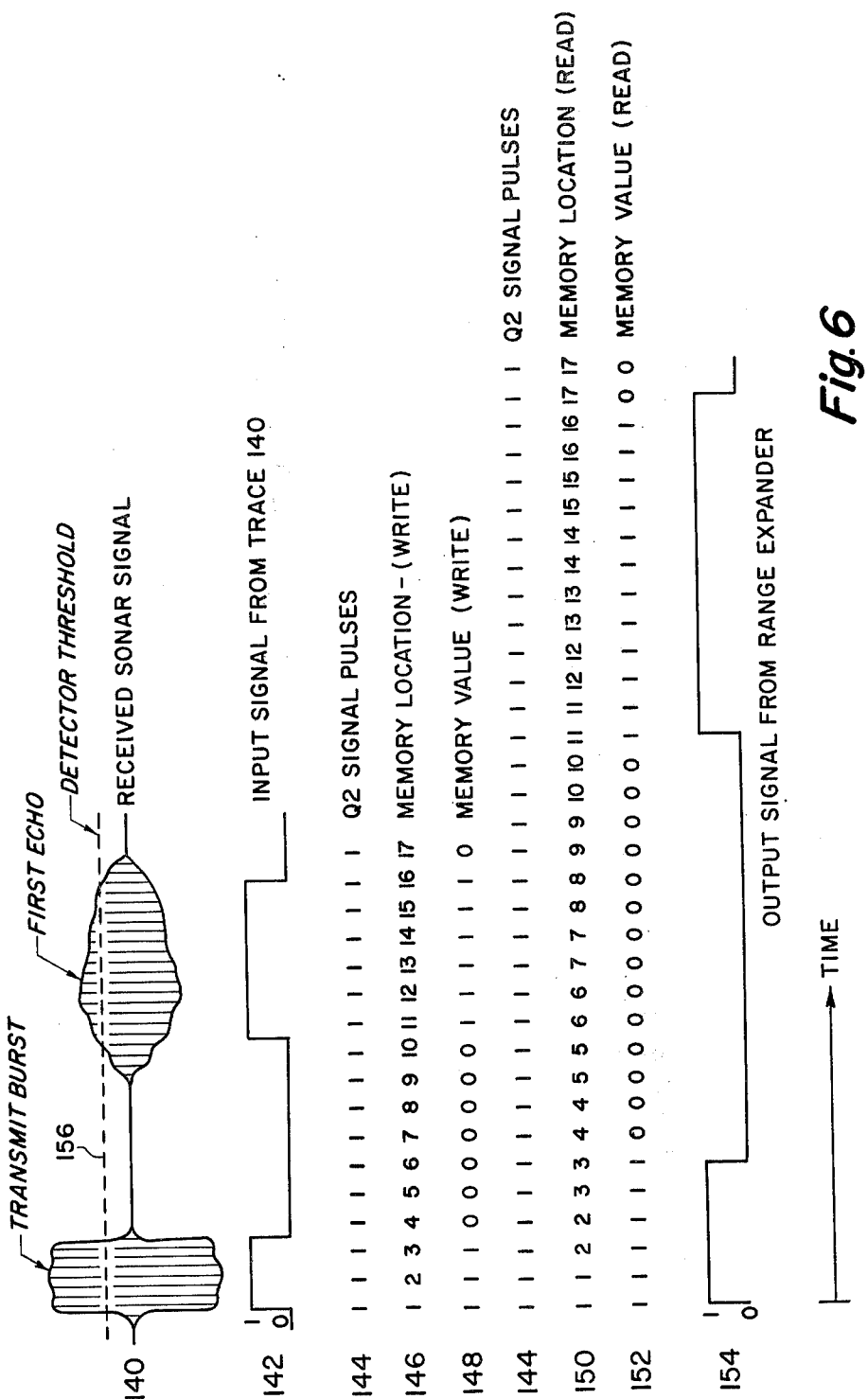
FIG. 6 illustrates the relations between the transmitted signal, the received signal, and the expanded signal.

Referring now to FIG. 6, there is shown a plurality of traces 140, 142, . . . 154 which illustrate the operation of this range expander when applied to a sonar system. Trace 140 represents the time record of the amplitude of transmitted and received signal from the transducer. A dashed line 156 represents the threshold amplitude of the received signal, labeled first echo. Trace 142 shows trace 140 as a bi-level signal. Trace 144 shows the series of clock controlled pulses which are read from the Q1 output of the binary counter. Trace 146 illustrates the serial numbers of the addresses, or memory locations, into which the signal 142 is sampled and written on command of the control logic. Trace 148 shows the corresponding binary signals loaded into the memory locations of 146 according to the signal 142.

The timing trace 144 corresponding to Q1 are repeated for convenience. Trace 150 represents a sequence of address values or memory locations from which data are read as a function of the binary word outputted from the counter 16. These addresses change at half the rate of the addresses on the write operation given on trace 146. The sequential address read from are 1,1 2,2 3,3 4,4 etc. The corresponding value of signal which have been stored in the addresses of trace 150 are the corresponding values of signal stored in trace 148 expanded by the time scale of 150. In other words the first three values of 1 signals of trace 148 are repeated in trace 152 to make six 1 signals. Correspondingly, the number 7 of 0 values stored in the addresses 4, 5, 6, 7, 8, 9, and 10 are expanded to 14 time periods. Since it takes twice as long to read out the data as it did to write it into the memory, the rotation of the light disc or the movement of the recording pin has correspondingly gone twice as far, and therefore the depth scale or distance scale has been doubled.

While I have indicated and illustrated an application of this time expander to a sonar apparatus, this is only by way of illustration and not by way of limitation, since the same apparatus can be used for time expansion in many other electronic devices.

In the drawings, the various boxes are commercial solid state devices available on the market and need not be described further.

The clock 18 is a simple oscillator and is well known.

The circuit 28A is simply a series pair of AND gates.

The control logic 28B is simply a pair of series AND gates controlled by Q0 and Q1 of the counter, to control the timing of read/write operations of the memory, and, in synchronism with this signal, to control the shift right logic.

The shift right logic 26 is made up of a plurality of non-inverting 3 state buffers 60 of the 400978 CMOS type.

The binary counters 16A and 16B are standard 4024 CMOS type. Two are connected in tandem, since they are only packaged in groups of 6.

The memory 14 is a 1024 bit fully decoded random access memory of the 2102 NMOS type.

The latch 36 is simply an AND gate having a small capacitor on its input to hold the last signal until the next signal is read.

While I have described the box 26 as a shift right logic means, which utilizes a plurality of special buffers, it will be clear that these buffers and the peripheral circuit means comprise a multi-channel switching means. With this switching means, which may be as simple as a relay, 2 inputs can be alternately switched to a single output. On this basis the same switching operations can be handled by other electronic elements, and is not limited to this one type of solid state device. Therefore, it will be claimed more broadly as a "multichannel switching means", whereby a selected memory address can be controlled alternately from one or another of the Q outputs of the binary counter.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification but is to be limited only by the scope of the attached claim or claims, including the full range of equivalency to which each element thereof is entitled.

What is claimed is:

1. Apparatus for extending the distance range of a sonar apparatus, comprising;
   (a) a clock of selected period;
   (b) digital binary counter means responsive to said clock; said counter means having a plurality of output terminals Q0, Q1, Q2, Q3, . . . QN;
   (c) a random access memory having a plurality of input address control terminals A0, A1, A2, A3, . . . AN; a signal input and signal output means, and a read/write control input terminal;
   (d) a multi-channel switching means, whereby a selected single memory address control terminal can be connected alternately to one or another of two selected Q terminals of said counter; and
   (e) means to synchronously control both said read/write operations of said memory, and said switching of said switching means.

2. The apparatus as in claim 1 and including a latch on the output lead of said memory.

3. The apparatus as in claim 1 in which said switching means alternately connects said address control terminal to one or the other of adjacent Q terminals.

4. The apparatus as in claim 1 in which said switching means alternately connects said address control terminal to a selected first Q terminal or to a second Q terminal where said second terminal is the second one away from said first one.

5. The apparatus as in claim 1 in which said switching means comprises a non-inverting 3 state buffer.

6. A digital memory system into which a stream of digital data of selected length can be written into said memory at a first bit rate, and from which the same digital data stream can be contemporaneously read out from said memory at a different slower bit rate, comprising;
   (a) a clock of selected period;
   (b) a digital binary counter controlled by said clock; said counter having a plurality of output terminals Q0, Q1, Q2, Q3, . . . QN;
   (c) a random access memory having a plurality of address control terminals A0, A1, A2, . . . N-2; a signal input, a signal output, and a read/write control input terminal;
   (d) a shift right logic means comprising a plurality of switching means, each capable of sequentially connecting a selected address control terminal to either of two selected Q outputs of said counter means; and
   (e) means to synchronously control both said read/write operations of said memory, and said switching of said switching means.

7. The apparatus as in claim 6 in which said switching means alternately connects said address control terminal to one or the other of adjacent Q terminals.

8. The apparatus as in claim 6 in which said switching means comprises a non-inverting 3 state buffer.

* * * * *

REEXAMINATION CERTIFICATE (554th)

United States Patent [19]
Weber

[11] B1 4,322,827
[45] Certificate Issued Aug. 12, 1986

[54] RANGE EXPANDER FOR SONAR SYSTEM

[75] Inventor: Ronald G. Weber, Tulsa, Okla.

[73] Assignee: Lowrance Electronics, Inc., Tulsa, Okla.

Reexamination Request:
No. 90/000,693, Dec. 20, 1984

Reexamination Certificate for:
Patent No.: 4,322,827
Issued: Mar. 30, 1982
Appl. No.: 189,047
Filed: Sep. 22, 1980

[51] Int. Cl.[4] .............................................. G01S 15/08
[52] U.S. Cl. ...................................... 367/99; 367/109; 367/115; 343/5 DP; 365/233
[58] Field of Search ............. 343/5 DP; 365/221, 233, 365/239, 240; 367/87, 99, 107, 108, 109, 113, 115

[56] References Cited

U.S. PATENT DOCUMENTS

| | | | |
|---|---|---|---|
| 3,731,284 | 5/1973 | Thies | 340/172.5 |
| 3,790,925 | 2/1974 | Ahrens | 343/5 DP X |
| 4,017,853 | 4/1977 | Brandao | 343/5 |

OTHER PUBLICATIONS

"Electronic Design" Magazine, Sep. 13, 1978, issue, vol. 26, No. 19, pp. 124–127, RAM-based multiplexer systems can save big chunks of hardware, by Zaheer M. Ali.

*Primary Examiner*—Richard A. Farley

[57] ABSTRACT

An electronic range expander, such as for use on a sonar system, which has a rotating disc lamp or a rectilinear pen record, of the travel time, expressed as a certain distance from the transducer to an object and back again. The received signal is sampled periodically, and these samples are stored in a random access memory, in addresses which are determined by binary numbers successively outputted from a binary counter, which is stepped in accordance with a clock signal. As the binary number representing an address in the memory is incremented, the sampled value of received signal is stored in the corresponding address. The command to write in the memory is repeated at a selected number of clock counts. Intermediate the commands to write into the memory, the command is given to read the signal stored in a selected address and to send it to a latch and to the output display or printer of the sonar apparatus. During the period in which the readout of data from memory takes place, a buffer in each of the leads from the counter to the memory causes the binary number from the counter to be shifted to the right one bit, and therefore the address read is ½ that of the last write address. Thus the stored values in the memory are read at ½ the rate at which they are written, which thereby causes 2/1 expansion of the time scale.

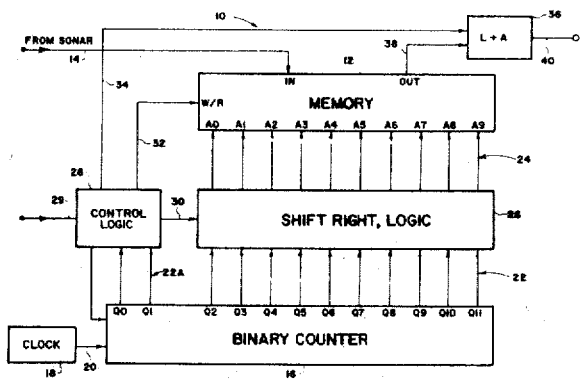

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 6 are cancelled.

Claims 3, 4, 5, 7 and 8 are determined to be patentable as amended.

3. [The apparatus as in claim 1 in which said switching means alternately connects said address control terminal to one or the other of] *Apparatus for extending the distance range of a sonar apparatus, comprising;*
  (a) *a clock of selected period;*
  (b) *digital binary counter means responsive to said clock; said counter means having a plurality of output terminals Q0, Q1, Q2, Q3, . . . QN;*
  (c) *a random access memory having a plurality of input address control terminals A0, A1, A2, A3, . . . AN; a signal input and signal output means, and a read/-write control input terminal;*
  (d) *a multi-channel switching means, whereby a selected single memory address control terminal can be connected alternately to one or another of two selected adjacent Q terminals of said counter; and*
  (e) *means to synchronously control both said read/write operations of said memory, and said switching of said switching means.*

4. [The apparatus as in claim 1 in which said switching means alternately connects said address control terminal] *Apparatus for extending the distance range of a sonar apparatus, comprising;*
  (a) *a clock of selected period;*
  (b) *digital binary counter means responsive to said clock; said counter means having a plurality of output terminals Q0, Q1, Q2, Q3, . . . QN;*
  (c) *a random access memory having a plurality of input address control terminals A0, A1, A2, A3, . . . AN; a signal input and signal output means, and a read/-write control input terminal;*
  (d) *a multi-channel switching means, whereby a selected single memory address control terminal can be connected alternately ep to a selected first Q terminal or to a second Q terminal of said counter where said second terminal is the second one away from said first one; and*
  (e) *means to synchronously control both said read/write operations of said memory, and said switching of said switching means.*

5. [The apparatus as in claim 1 in which] *Apparatus for extending the distance range of sonar apparatus, comprising;*
  (a) *a clock of selected period;*
  (b) *digital binary counter means responsive to said clock; said counter means having a plurality of output terminals Q0, Q1, Q2, Q3, . . . QN;*
  (c) *a random access memory having a plurality of input address control terminals A0, A1, A2, A3, . . . AN; a signal input and signal output means, and a read/-write control input terminal;*
  (d) *a multi-channel switching means, whereby a selected single memory address control terminal can be connected alternately to one or another of two selected Q terminals of said counter; wherein said switching means comprises a non-inverting 3 state buffer; and*
  (e) *means of synchronously control both said read/write operations of said memory, and said switching of said switching means.*

7. [The apparatus as in claim 6 in which said switching means alternately connects said address control terminal to one or the other of] *A digital memory system into which a stream of digital data of selected length can be written into said memory at a first bit rate, and from which the same digital data stream can be contemporaneously read out from said memory at a different slower bit rate, comprising;*
  (a) *a clock of selected period;*
  (b) *a digital binary counter controlled by said clock; said counter having a plurality of output terminals Q0, Q1, Q2, Q3, . . . QN;*
  (c) *a random access memory having a plurality of address control terminals A0, A1, A2, . . . AN-2; a signal input, a signal output, and a read/write control input terminal;*
  (d) *a shift right logic means comprising a plurality of switching means, each capable of sequentially connecting a selected address control terminal to either of two selected adjacent Q* [terminals] *outputs of said counter means; and*
  (e) *means to synchronously control both said read/write operations of said memory, and said switching of said switching means.*

8. [The apparatus as in claim 6 in which] *A digital memory system into which a stream of digital data of selected length can be written into said memory at a first bit rate, and from which the same digital data stream can be contemporaneously read out from said memory at a different slower bit rate, comprising;*
  (a) *a clock of selected period;*
  (b) *a digital binary counter controlled by said clock; said counter having a plurality of output terminals Q0, Q1, Q2, Q3, . . . QN;*
  (c) *a random access memory having a plurality of address control terminals A0, A1, A2, . . . AN-2; a signal input, a signal output, and a read/write control input terminal;*
  (d) *a shift right logic means comprising a plurality of switching means, each capable of sequentially connecting a selected address control terminal to either of two selected Q outputs of said counter means wherein said switching means comprises a non-inverting 3 state buffer; and*
  (e) *means to synchronously control both said read/write operations of said memory, and said switching of said switching means.*

* * * * *